United States Patent [19]

Kim

[11] Patent Number: 5,754,684
[45] Date of Patent: May 19, 1998

[54] IMAGE AREA DISCRIMINATION APPARATUS

[75] Inventor: Oon-yil Kim, Seoul, Rep. of Korea

[73] Assignee: Samsung Electronics Co., Ltd., Kyungki-Do, Rep. of Korea

[21] Appl. No.: 365,538

[22] Filed: Dec. 28, 1994

[30] Foreign Application Priority Data

Jun. 30, 1994 [KR] Rep. of Korea ............... 1994-15689

[51] Int. Cl.⁶ .................................................. G06K 9/34
[52] U.S. Cl. .............................. 382/176; 382/282; 358/462
[58] Field of Search ................................. 358/456, 462, 358/454, 534, 465, 466; 382/112, 173, 168, 194, 195, 270, 271, 273, 282, 176, 199

[56] References Cited

U.S. PATENT DOCUMENTS

| | | | |
|---|---|---|---|
| 4,893,195 | 1/1990 | Tada et al. | 358/454 |
| 4,939,590 | 7/1990 | Tada | 358/451 |
| 5,018,024 | 5/1991 | Tanioka | 358/457 |
| 5,025,481 | 6/1991 | Ohuchi | 382/53 |
| 5,134,667 | 7/1992 | Suzuki | 382/164 |
| 5,148,495 | 9/1992 | Imao et al. | 358/462 |
| 5,193,122 | 3/1993 | Kowalski et al. | 382/173 |
| 5,296,939 | 3/1994 | Suzuki | 358/462 |
| 5,299,030 | 3/1994 | Kim | 358/462 |
| 5,331,442 | 7/1994 | Sorimachi | 358/462 |
| 5,339,365 | 8/1994 | Kawai et al. | 382/176 |
| 5,341,224 | 8/1994 | Eschbach | 358/462 |
| 5,341,227 | 8/1994 | Kamashiro | 358/533 |
| 5,379,130 | 1/1995 | Wang et al. | 358/462 |
| 5,387,983 | 2/1995 | Sagiura et al. | 358/434 |
| 5,410,619 | 4/1995 | Fujisawa et al. | 358/462 |

*Primary Examiner*—Joseph Mancuso
*Assistant Examiner*—Jon Chang
*Attorney, Agent, or Firm*—Rothwell, Figg, Ernst & Kurz

[57] ABSTRACT

An image area discrimination apparatus for discriminating a text area and a screen dot area from an image containing text mixed with a picture, has a block-by-block image area discriminator which receives an image signal to discriminate an image area of the received image signal on a block-by-block basis, a text area detector which receives a first output of the block-by-block image area discriminator to discriminate a text area, a screen dot area detector which receives a second output of the block-by-block image area discriminator to discriminate a screen dot area, and a final discriminator which receives outputs of the text area detector and the screen dot area detector, to discriminate an image area block by block. Accordingly, the text is separated from the picture, to suppress the moiré effect of a screen-dot-printed picture.

11 Claims, 8 Drawing Sheets

FIG. 3A    FIG. 3B    FIG. 3C    FIG. 3D
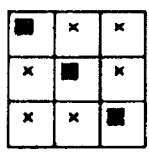 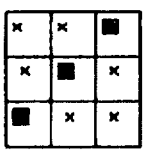 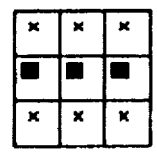 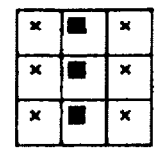
■ :EDGE LEVEL PIXEL ← TH3 ≥ PIXEL DATA LEVEL ≥ TH2
× :DON'T CARE
FIG. 4A    FIG. 4B    FIG. 4C    FIG. 4D
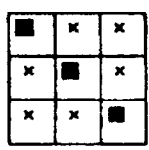 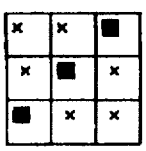 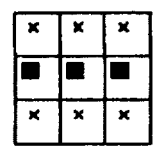 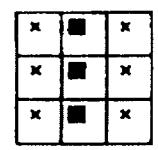
■ :BLACK LEVEL PIXEL ← PIXEL DATA LEVEL ≤ TH2
× :DON'T CARE
FIG. 5A    FIG. 5B    FIG. 5C    FIG. 5D
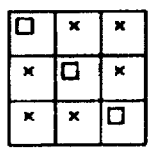 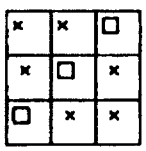 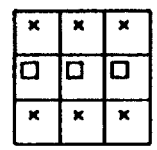 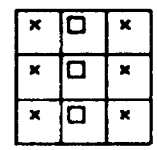
□ :WHITE LEVEL PIXEL ← PIXEL DATA LEVEL ≥ TH1
× :DON'T CARE

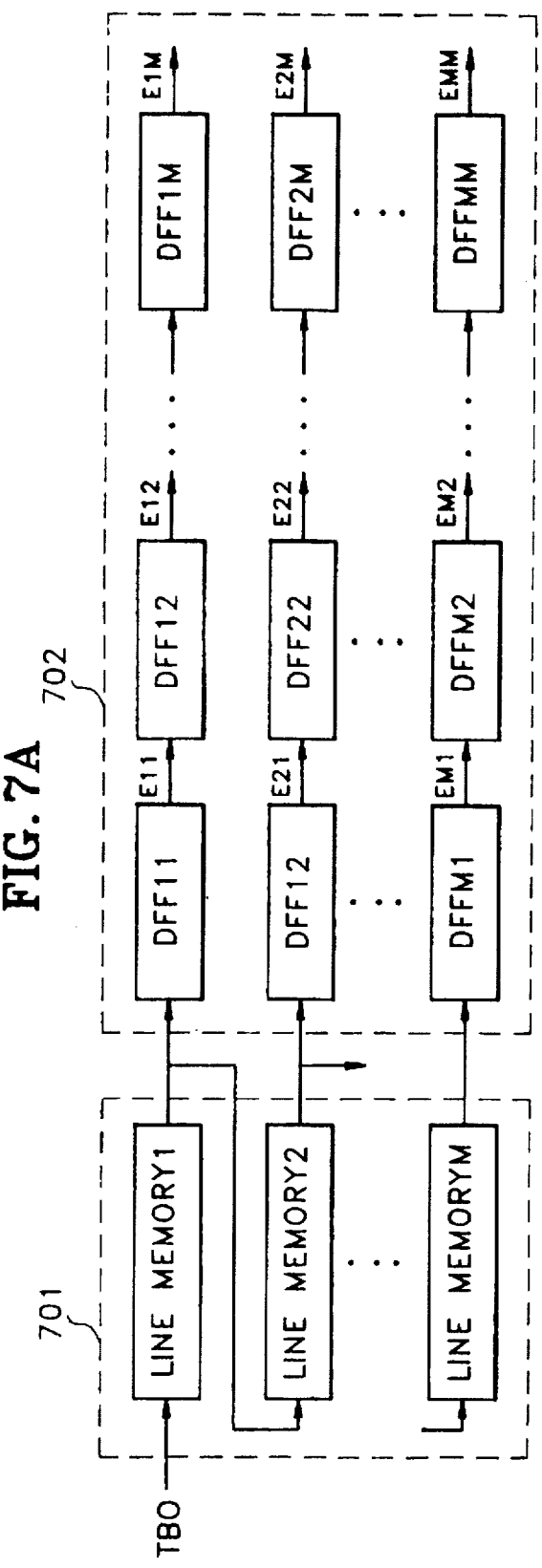
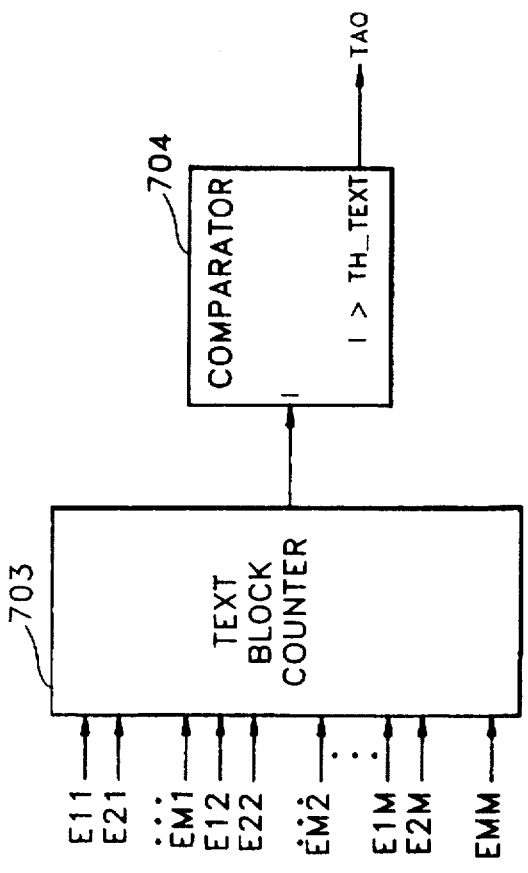

IMAGE AREA DISCRIMINATION APPARATUS

BACKGROUND OF THE INVENTION

The present invention relates to an image area discrimination apparatus for discriminating a text area and a screen dot area from an image containing text mixed with a picture.

It is important to regenerate colors which match a human's visual characteristic in order to print out a high resolution color image. Particularly, it is difficult to regenerate an achromatic color such as black or white when a color ink or a color toner is being used. Thus, a portion containing an achromatic color component only, particularly containing black text or black lines has been processed as only a black color, to enhance the sharpness of the playback image. For doing so, it requires an image area discrimination technology for accurately discriminating a portion such as a text area which should be processed as only a black color in an image.

Also, except for certain special-purpose cases, most documents to be image-processed are screen-dot-printed out. Such documents generally have resolutions of 65–200 LPI (lines per inch) and the image signal frequency, being converted by an image input apparatus (e.g., a scanner), increases for the higher resolutions. Accordingly, a moiré phenomenon becomes severe. To eradicate such a moiré phenomenon, a screen dot area should be discriminated to then perform a flattening process.

Such an image area discrimination apparatus for segmenting a text area and a screen dot area has been developed along with advances in digital copiers, document filing apparatuses, etc. However, there are still many problems to be solved.

A paper entitled "Segmentation Method for Documents Containing Text/Picture (Screened Halftone, Continuous Tone)" by Satoshi Ohuchi, Kaoru Imao and Wasaku Yamada (see *Journal of Japanese Electronics and Information Communication Associates*, Volume J 75 D–H, No. 1, pp39–47, January 1992) presents an image area segmentation technology having a comparatively excellent discrimination capability. However, such a discrimination capability is dramatically lowered in the case involving complex text of a size less than or equal to ten point.

Also, Japanese patent laid-open hei 5-145768 (filed on Jun. 13, 1993) discloses another image area segmentation technology as in the apparatus of FIG. 1. Here, modulation transfer function (MTF) corrector 11 processes sharpness of an image. That is, MTF corrector 11 performs an edge emphasis process of the input image signal and supplies the edge emphasized signal to a screen dot extractor 10 and an edge extractor 12. Edge extractor 12 binarizes the MTF corrected data. When 3×3 matrix pattern having a pixel (an object pixel) to be discriminated as a center pixel matches any one of the patterns shown in FIGS. 3A–3D, edge extractor 12 discriminates that the object pixel is a black continuous pixel or a white continuous pixel and outputs the discriminated result.

Black area extractor 13 is a pre-processor for discriminating a black edge and discriminates an area including a black pixel. This discrimination processing is performed in units of a block of 4×4 pixels. When there are at least two black pixels within a block of 4×4 pixels, the block is discriminated as a reserve block. When there are at least two reserve blocks within a block of 3×3 pixels having a block (an object block) including an object pixel as a center block, the object block is discriminated as a black block.

Black edge discriminator 14 discriminates a portion which is an edge pixel as well as a black block as a black edge pixel using an output result of edge extractor 12 and black area extractor 13 and outputs the discriminated result.

White area extractor 15 detects a pixel having a lower concentration than that including most of the white areas as a white pixel.

Black/white text block discriminator 17 discriminates a block which does not include a screen dot area and in which most of the pixels in a block of 16×16 pixels are black edge pixels or white pixels as a black-text/white-text block.

An isolated screen dot block eradicator 18 enhances a degree of segmentation of a black-text/white-text area, and eradicates the isolated screen dot area among the black-text/white-text area.

Screen dot block expander 19 expands a screen dot block on a block by block basis not so as to missegment a screen dot contour portion as a black-text/white-text area, and processes a block which includes a few of the screen dot areas as a screen dot block.

Since a screen dot area and a text area are independently detected in an intermediate step which processes in units of a block in the FIG. 1 apparatus, a probability of misdiscrimination becomes high.

FIG. 6A shows a result of detecting a text pattern from a text document. FIG. 6B shows a result of detecting a peak pixel from the same text document as that shown in FIG. 6A. That is, it can be seen that the text document also has the characteristic of the screen dot. Such a phenomenon is increased as the text grows smaller and more complex.

FIG. 6C shows a result of detecting a text pattern from a screen dot manuscript. FIG. 6D shows a result of detecting a peak pixel from the same screen-dot document as that shown in FIG. 6C. That is, it can be seen that the screen-dot document also has the characteristic of the text. As shown in FIGS. 6B and 6C, since the text and screen dot having a small and complex structure tend to have also the characteristics of the text and the screen dot, it is apt to become misdiscriminated.

Also, when an edge pattern used for discriminating the text area is detected, the input image is converted into three values such as a black level, an intermediate level and a white level, to find a pixel pattern of a continuous black level or a continuous white level. In this case, if a threshold value for three value conversion is dense, and particularly an effective range of a black level and a white level is narrow, a stable image area discrimination is possible. Otherwise, a probability of misdiscriminating a non-text area into a text area becomes high.

Also, when a solid-state pickup element is used as an image input apparatus, a boundary pattern of the intermediate level occurs at a portion having a sudden tonal change such as the text. Accordingly, in the conventional system, since such a portion unequally belongs to the black level or the white level, it causes the boundary portion to be reproduced poorly.

SUMMARY OF THE INVENTION

To solve the above problems, it is an object of the present invention to provide an image area discrimination apparatus for suppressing a discrimination error which frequently occurs in an edge of a text having a complicated structure such as a Chinese character.

To accomplish the above object according to the present invention, there is provided an image area discrimination apparatus comprising: a block-by-block image area discriminator which receives an image signal to discriminate an image area of the received image signal block by block; a text area detector which receives a first output of the block-by-block image area discriminator to discriminate a text area; a screen dot area detector which receives a second output of the block-by-block image area discriminator to discriminate a screen dot area; and a final discriminator which receives outputs of the text area detector and the screen dot area detector, to discriminate an image area block by block.

BRIEF DESCRIPTION OF THE DRAWINGS

Further features and advantages of the present invention will become more apparent from the following description, reference being made to accompanying drawings wherein a preferred embodiment of present invention is clearly shown.

In the drawings:

FIGS. 3A through 3D show examples of matrix patterns which are used in detecting a pattern in an edge pattern detector shown in FIG. 2;

FIGS. 4A through 4D show examples of matrix patterns which are used in detecting a pattern in a black pattern detector shown in FIG. 2;

FIGS. 5A through 5D show examples of matrix patterns which are used in detecting a pattern in a white pattern detector shown in FIG. 2;

FIGS. 7A and 7B show a block diagram of a text area detector shown in FIG. 2 and an example of the text area;

DETAILED DESCRIPTION OF THE INVENTION

A preferred embodiment of an image area discrimination apparatus according to the present invention will be described below with reference to the accompanying drawings.

Figure 1:
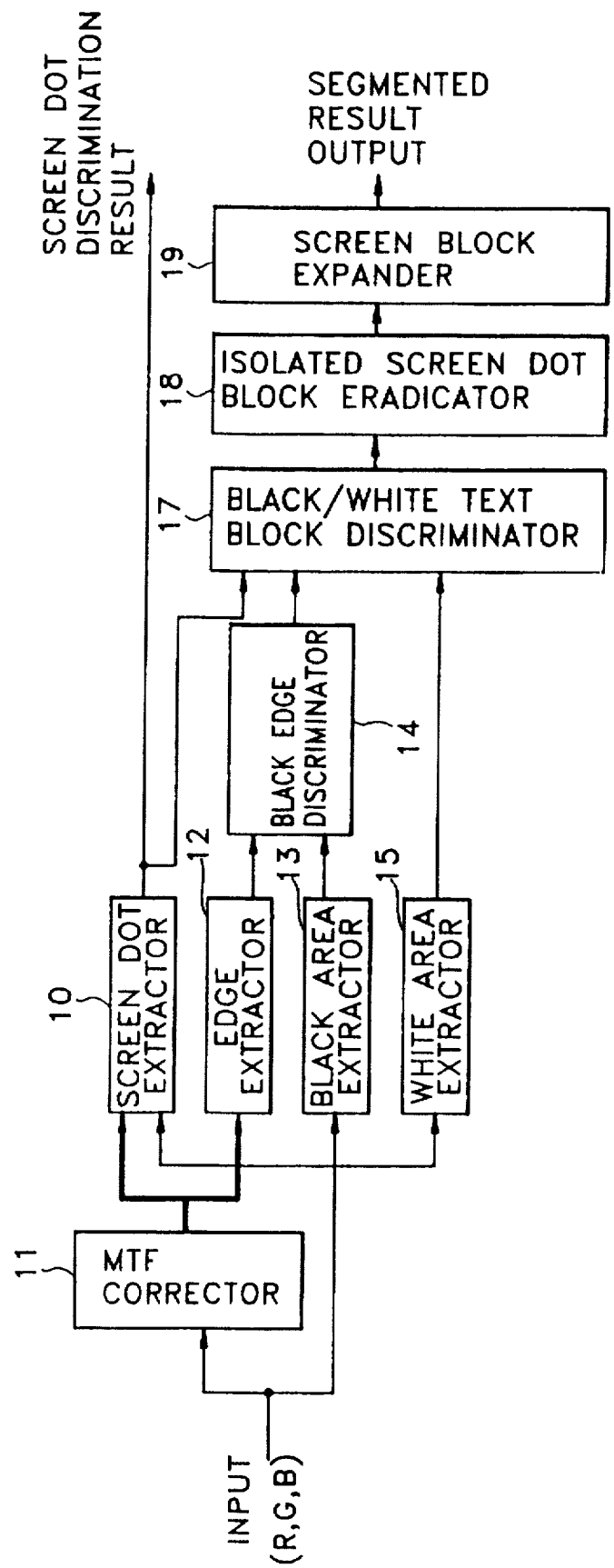
FIG. 1 is a block diagram of a conventional image area discrimination apparatus.
Figure 2:
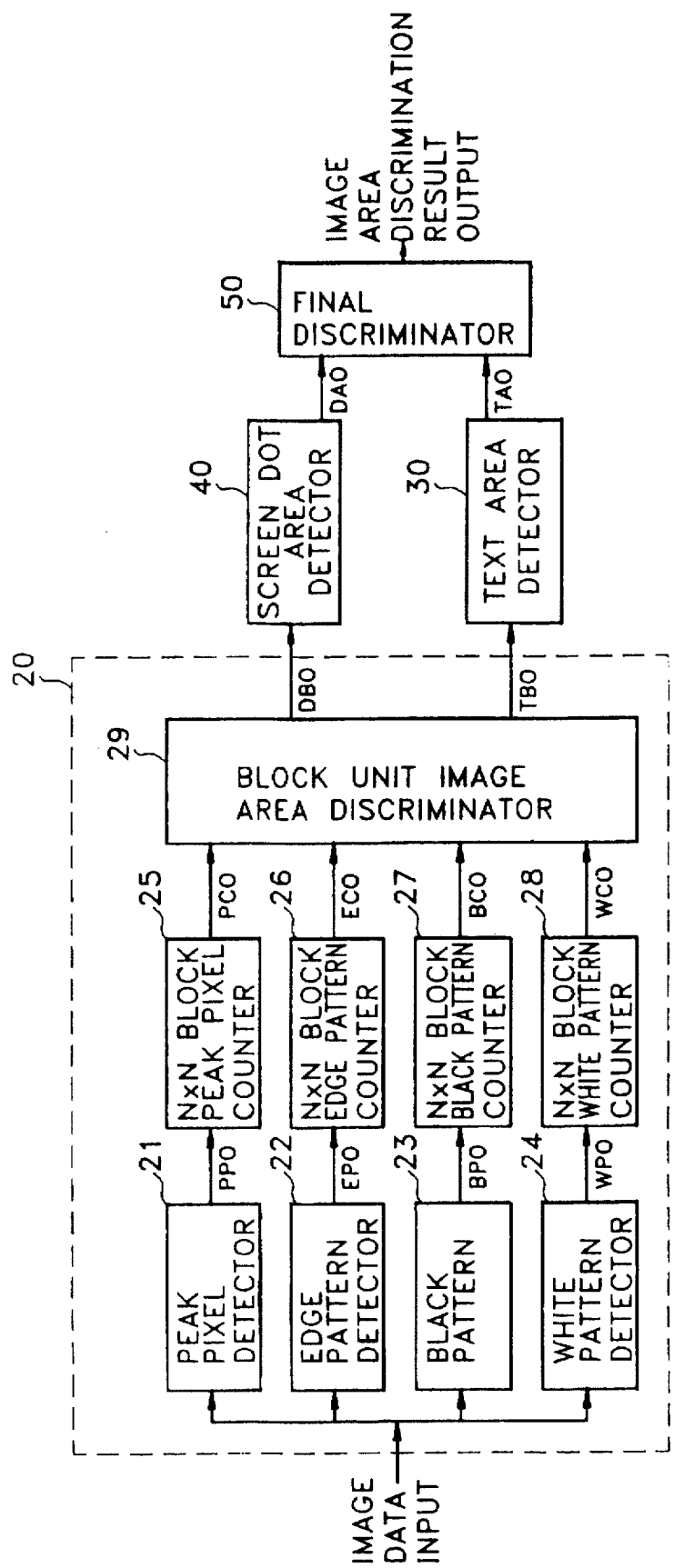
FIG. 2 is a block diagram of an image area discrimination apparatus according to the present invention.
Figure 6A:
FIGS. 6A and 6D show examples of detecting a text pattern and a screen dot peak pixel in a text manuscript and a screen dot document, respectively.
Figure 6B:
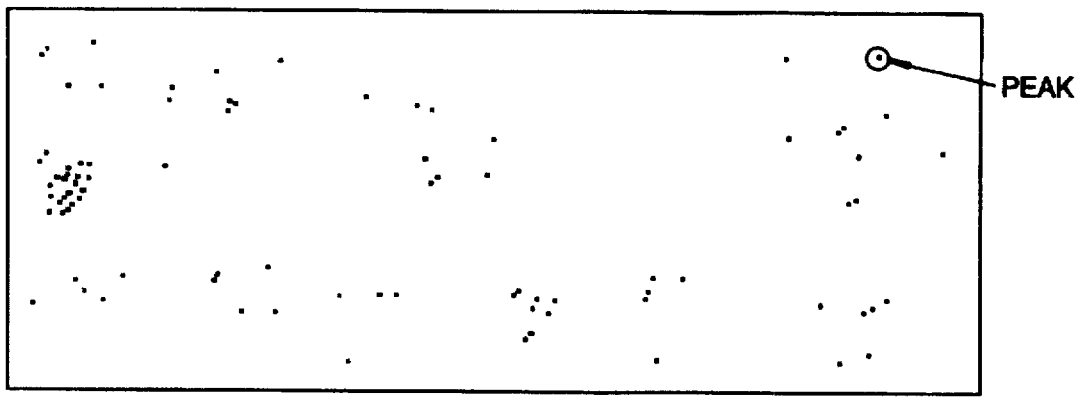
Figure 6C:
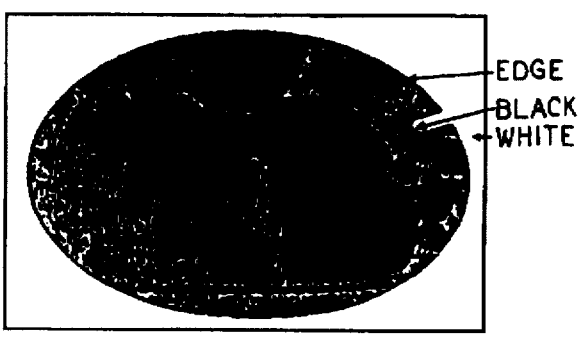
Figure 6D:

In FIG. 2 showing an image area discrimination apparatus according to the present invention, a block discriminator 20 receives a luminance signal among an image signal and then discriminates an image area block by block. A text area detector 30 receives a first output of block discriminator 20 and then discriminates a text area. A screen dot area detector 40 receives a second output of block discriminator 20 and then discriminates a screen dot area. A final discriminator 50 receives outputs of text area detector 30 and screen dot area detector 40 and discriminates an image area block by block.

Block-by-block image area discriminator 20 includes a peak pixel detector 21 for detecting a screen dot, a peak pixel counter 25 for performing a block formation process with respect to the output of peak pixel detector 21 and counting the number of the screen dots included in the block, an edge pattern detector 22 for detecting an edge pixel, an edge pattern counter 26 for performing a block formation process with respect to the output of edge pattern detector 22 and counting the number of the edge pixels included in the block, a black pattern detector 23 for detecting a black pixel, a black pattern counter 27 for performing a block formation process with respect to the output of black pattern detector 23 and counting the number of the black pixels included in the block, a white pattern detector 24 for detecting a white pixel, a white pattern counter 28 for performing a block formation process with respect to the output of white pattern detector 24 and counting the number of the white pixels included in the block, and a block unit image area discriminator 29 for discriminating a block unit image area according to the outputs of respective counters 25, 26, 27 and 28.

Figure 11A:
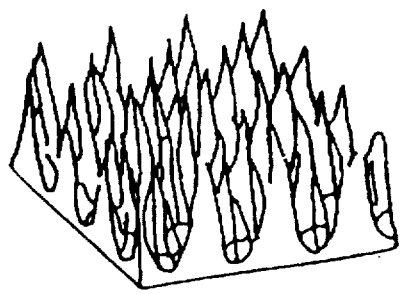
FIG. 11A shows a change of concentration of a white and black screen dot image.
Figure 11B:
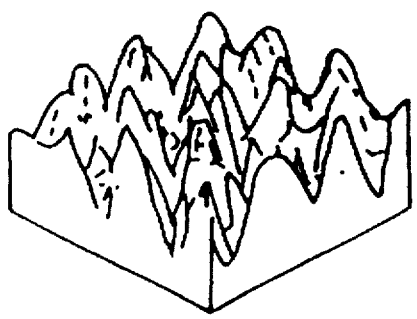
FIG. 11B shows a change of concentration of a color screen dot image.
Figure 11C:
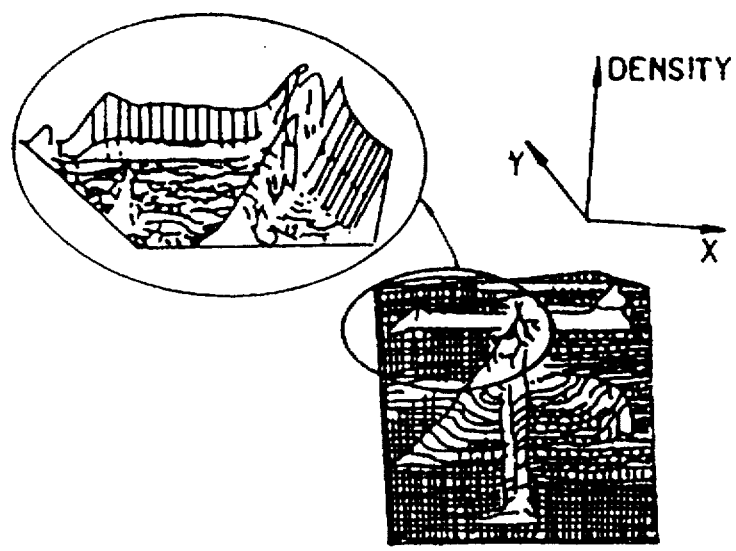
FIG. 11C shows a change of concentration of a text image.

An operation of the apparatus shown in FIG. 2 will be described in more detail. First, pictures which show a change of concentration of a screen dot color image which is read by a white and black scanner are shown in FIGS. 11A through 11C. FIG. 11A shows a change of concentration of a screen dot area in a white and black screen dot image. FIG. 11B shows a change of concentration of a screen dot area in a color screen dot image. FIG. 11C shows a change of concentration of a text area.

It can be seen that screen dots having irregular sizes exist discontinuously in the screen dot area of FIGS. 11A and 11B. On the contrary, it can be seen that screen dots having regular sizes exist continuously in the text area of FIG. 11C.

Using the above characteristics, peak pixel detector 21 detects a pixel which is the largest or the smallest in comparison with peripheral pixels in a local area having an N×N pixel size, which is hereinafter referred to a peak pixel PPO.

Edge pattern detector 22 detects an edge pixel which is located between a black pixel threshold level TH2 and an intermediate position TH3 having a lower value than a white pixel threshold level TH1. Edge pattern detector 22 outputs an edge pattern signal EPO when a 3×3 matrix pattern having an object pixel as a center pixel matches any one of the 3×3 patterns shown in FIGS. 3A through 3D.

Black pattern detector 23 detects a black pixel which has a smaller level than black pixel threshold level TH2. Black pattern detector 23 outputs a black pattern signal BPO when a 3×3 matrix pattern having an object pixel as a center pixel matches any one of the 3×3 patterns shown in FIGS. 4A through 4D.

White pattern detector 24 detects a white pixel which has a larger level than white pixel threshold level TH1. White pattern detector 24 outputs a white pattern signal WPO when a 3×3 matrix pattern having an object pixel as a center pixel matches any one of the 3×3 patterns shown in FIGS. 5A through 5D.

Peak pixel counter 25, edge pattern counter 26, black pattern counter 27 and white pattern counter 28 count the number of the respective characteristics in the block having an N'×N' pixel and supplies the counted result to block unit image area discriminator 29.

Block unit image area discriminator 29 receives the outputs PCO, ECO, BCO, and WCO of peak pixel counter 25, edge pattern counter 26, black pattern counter 27 and white pattern counter 28, and generates image discrimination signal TBO and DBO according to the following Table 1.

TABLE 1

| conditions | | TBO | DBO | remarks |
|---|---|---|---|---|
| PCO ≧ TH_BDOT1 | | 0 | 1 | screen dot picture |
| PCO < TH_BDOT1 | PCO ≧ TH_BDOT2 & (ECO + BCO) < TH_BT | 0 | 1 | screen dot picture |
| | (ECO + BCO) ≧ TH_BT & WCO ≧ TH_BW | 1 | 0 | text |
| | others | 0 | 0 | non-screen dot picture |

The TBO signal output from block unit image area discriminator 29 is supplied to text area detector 30.

FIG. 7A is a block diagram of the text area detector shown in FIG. 2. In the FIG. 7A apparatus, a reference numeral 701 denotes a line memory portion, a reference numeral 702 denotes a D flip-flop portion, a reference numeral 703 denotes a counter and a reference numeral 704 denotes a comparator.

Each column of D flip-flops in the D flip-flop portion 702 is composed of a column of the M×M array shown in FIG. 7B, and each row of D fip-flops in the D flip-flop portion 702 is composed of a row of the M×M array shown in FIG. 7B. In a structure of a block shown in FIG. 7B, an $ij^{th}$ block represents an object block.

The outputs TBO11, TBO12, . . . , TBOMM from respective D-flip-flops DFF11, DFF12, . . . , DFFMM in D flip-flop portion 702 are supplied to counter 703.

Counter 703 counts the number of the text blocks in the M×M block including object block DBOij. The counted value in counter 703 is supplied to comparator 704 and compared with threshold value TH_TEXT. If the counted value is larger than threshold value TH_TEXT, comparator 704 outputs a logic "1" TAO signal. The DBO signal output from block unit image area discriminator 29 is supplied to screen dot area detector 40.

Figure 8A:
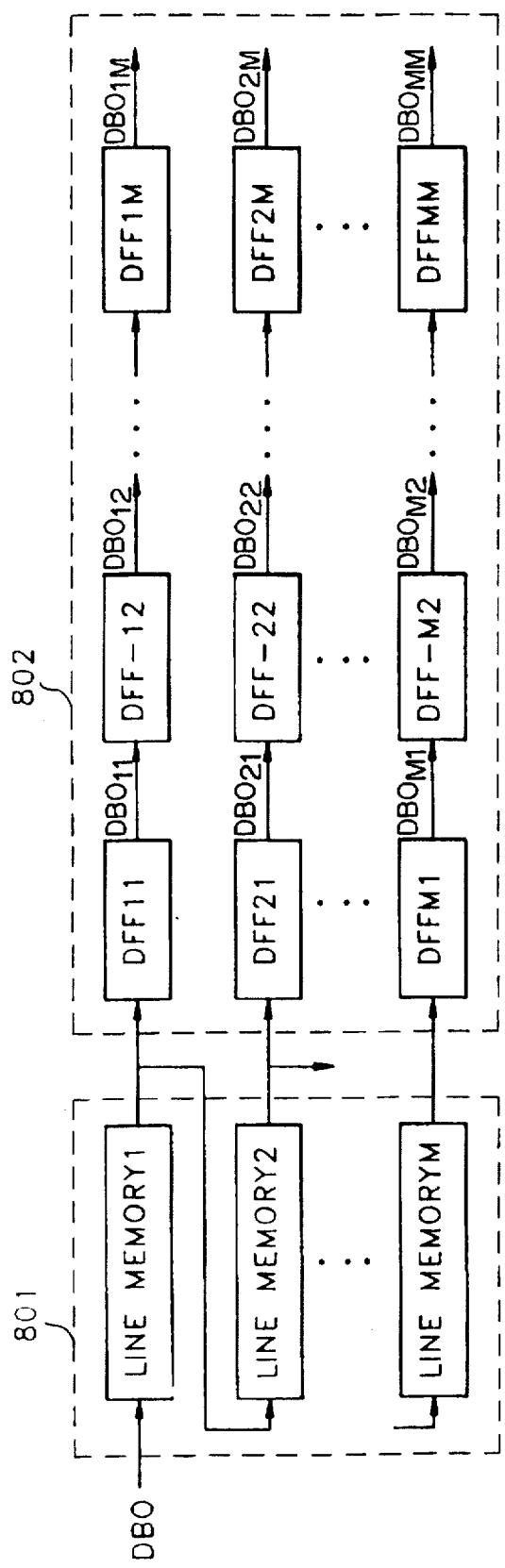
FIGS. 8A and 8B show a block diagram of a screen dot area detector shown in FIG. 2 and an example of the screen dot area.
Figure 8B:
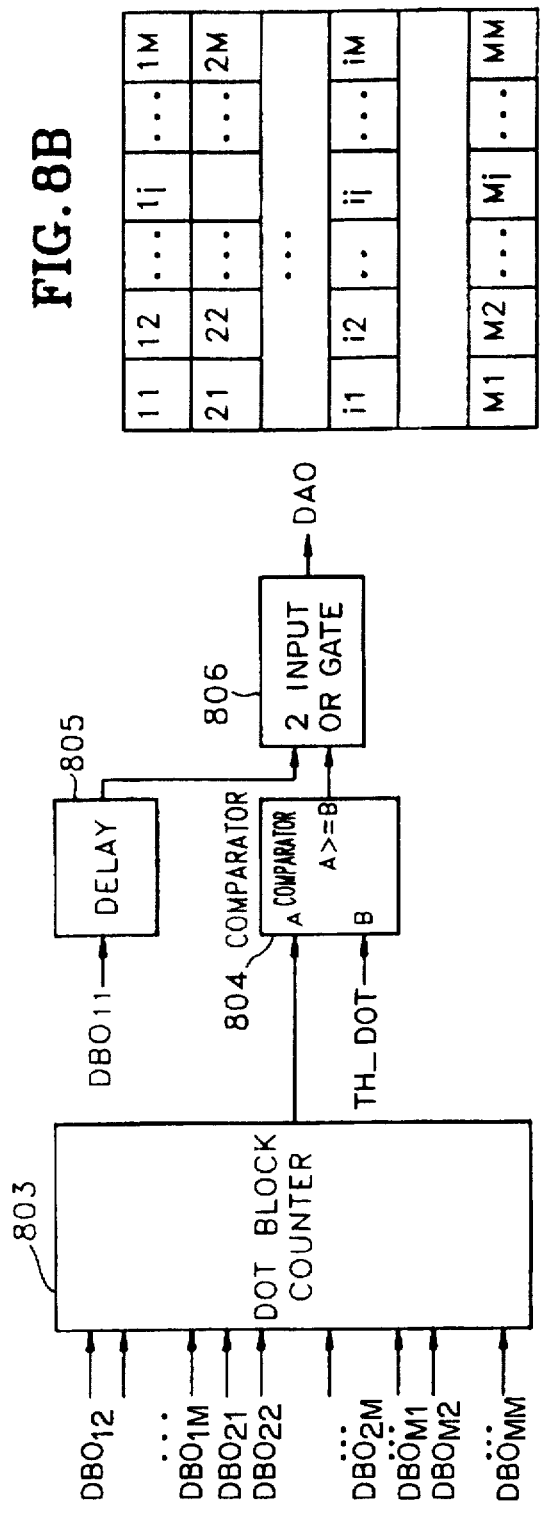

FIG. 8A is a block diagram of the screen dot area detector 40 shown in FIG. 2. In the FIG. 8A apparatus, a reference numeral 801 denotes a line memory portion, a reference numeral 802 denotes a D flip-flop portion, a reference numeral 804 denotes a comparator, a reference numeral 805 denotes a delay and a reference numeral 806 denotes a logic OR gate. Each column of D flip-flops in the D flip-flop portion 802 is composed of a column of the M×M array shown in FIG. 8B, and each row of D flip-flops in the D flip-flop portion 802 is composed of a row of the M×M array sown in FIG. 8B. In a structure of a block shown in FIG. 8B, an $ij^{th}$ block represents an object block.

The outputs DBO11, DBO12, . . . , DBOMM from respective D-flip-flops DFF11, DFF12, . . . , DFFMM in pixel memory portion 802 are supplied to counter 803.

Counter 803 counts the number of the screen dot blocks in the M×M block excluding object block DBOij. The counted value in counter 803 is supplied to comparator 804 and compared with threshold value TH_DOT. If the counted value is larger than threshold value TH_DOT, comparator 804 outputs a logic "1" DAO signal. The output from comparator 804 is logically summed with the DBO signal output from delay 805 in logic OR gate 806.

The outputs form text area detector 30 and screen dot area detector 40 are supplied to a final discriminator 50.

Figure 9:
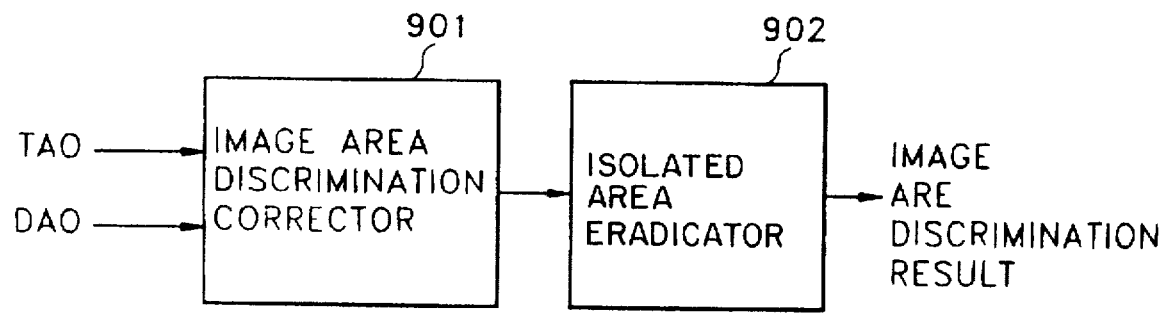
FIG. 9 is a more detailed block diagram of a final discriminator shown in FIG. 2.
Figure 10A:
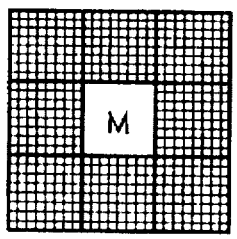
FIGS. 10A through 10E show examples of matrix patterns in detecting an isolated pattern in an isolated area eradicator shown in FIG. 9.
Figure 10B:
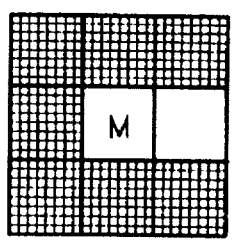
Figure 10C:
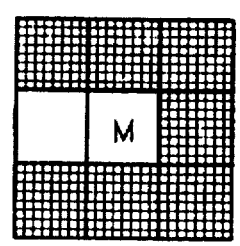
Figure 10D:
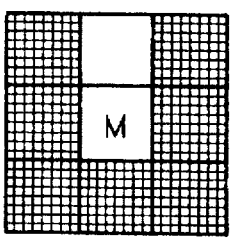
Figure 10E:
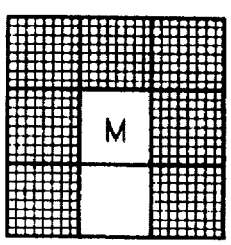

FIG. 9 shows a detailed block diagram of final discriminator 50. In FIG. 9, a reference numeral 901 denotes an image area discrimination corrector and a reference numeral 902 denotes an isolated area eradicator. An operation of image area discrimination corrector 901 is according to the following Table 2.

TABLE 2

| TAO | DAO | final discrimination result |
|---|---|---|
| 1 | 0 | text area |
| 0 | 1 | screen dot area |
| 1 | 1 | non-screen dot area |
| 0 | 0 | non-screen dot area |

The result which is corrected in image area discrimination corrector 901 is supplied to isolated area eradicator 902. Isolated area eradicator 902 assimilates the area of the object block into that of the peripheral block when the 3×3 matrix pattern having the object block as a center block matches any one of the 3×3 patterns shown in FIGS. 10A through 10E in which a reference symbol M denotes the object block, thereby outputting a final image area discrimination result.

As described above, the image area discrimination apparatus according to the present invention uses the edge signal having an intermediate level between the black level and the white level, to enhance a degree of discrimination at the edge of the text.

Also, the image area discrimination apparatus according to the present invention limits a level difference between the contiguous pixels which forms the text pattern into a predetermined small value and then detects the respective patterns, to enhance a degree of discrimination of complex text.

Further, the isolated area is corrected so as to be assimilated to the peripheral block, a discrimination error which occurs at the inner portion of the thick character. The highlighted and shadow portions of the picture are prevented.

Also, the present invention has an effect in that the text is separated from the screen-dot printed picture, to suppress the moiré of the screen-dot printed picture.

What is claimed is:

1. An image area discrimination apparatus comprising:
    a block-by-block image area discriminator which receives an image signal and discriminates an image area of the received image signal block by block, said block-by-block image area discriminator having an edge pattern detector for detecting an edge pixel wherein the edge pixel detected in said edge detector has a distribution range which is smaller than a threshold value of a white pixel but is greater than a threshold value of a black pixel;
    a text area detector which receives a first output of the block-by-block image area discriminator and discriminates a text area;
    a screen dot area detector which receives a second output of the block-by-block image area discriminator and discriminates a screen dot area; and
    a final discriminator which receives outputs of the text area detector and the screen dot area detector, and discriminates an image area block by block.

2. An image area discrimination apparatus according to claim 1, wherein the edge pixel detected in said edge pattern detector has a distribution range which is represented as the following inequality:

$$TH1-k \geq P_{edge} \geq TH2,$$

wherein $P_{edge}$ is an edge pixel, TH1 is a threshold value of a white pixel, TH2 is a threshold value of a black pixel, and k is a constant.

3. An image area discrimination apparatus according to claim 1, wherein said final discriminator further comprises an isolated area eradicator which assimilates an object block into that of a peripheral area and outputs the final image area discrimination result.

4. An image area discrimination apparatus according to claim 3, wherein said isolated area eradicator processes the object block and at least one block adjacent to said object block, and assimilates said object block and the adjacent blocks into peripheral blocks.

5. An image area discrimination apparatus according to claim 1, wherein the image signal input to said block-by-block image area discriminator is a luminance signal.

6. The image area discrimination apparatus according to claim 1 further comprising:

means for limiting a difference between the luminance value of contiguous pixels which form text patterns to no more than a predetermined small value; and means for detecting said text patterns.

7. An image area discrimination apparatus comprising:

a block-by-block image area discriminator means for receiving an image signal, discriminating an image area of the received image signal block by block and generating a first signal indicative of text in a block and a second signal indicative of a block being a screen dot picture, said block-by-block image area discriminator means including a peak pixel detector means for detecting a screen dot and generating an output indicative of the detection, a peak pixel counter means for performing a block formation process with respect to the output of said pixel detector and counting the number of the screen dots included in the block, an edge pattern detector means for detecting an edge pixel and generating an output indicative of the detection, said edge pattern detector for detecting an edge pixel wherein the edge pixel detected in said edge detector has a distribution range which is smaller than a threshold value of a white pixel but is greater than a threshold value of a black pixel, an edge pattern counter means for performing a block formation process with respect to the output of the edge pattern detector and counting the number of the edge pixels included in the block, a black pattern detector means for detecting a black pixel and generating an output indicative of the detection, a black pattern counter means for performing a block formation process with respect to the output of the black pattern detector and counting the number of the black pixels included in the block, a white pattern detector means for detecting a white pixel and generating an output indicative of the detection, a white pattern counter means for performing a block formation process with respect to the output of the white pattern detector and counting the number of the white pixels included in the block, and a block unit image area discriminator means for discriminating a block unit image area according to the outputs of the respective counters;

a text area detector which receives a first output of the block-by-block image area discriminator to discriminate a text area;

a screen dot area detector which receives a second output of the block-by-block image area discriminator to discriminate a screen dot area; and a final discriminator which receives outputs of the text area detector and the screen dot area detector, to discriminate an image area block by block.

8. An image area discrimination apparatus according to claim 7, wherein the edge pixel detected in said edge pattern detector has a distribution range which is represented as the following inequality:

$$TH1-k \geq P_{edge} \geq TH2,$$

wherein $P_{edge}$ is an edge pixel, TH1 is a threshold value of a white pixel, TH2 is a threshold value of a black pixel, and k is a constant.

9. An image area discrimination apparatus according to claim 7, wherein said final discriminator further comprises an isolated area eradicator which assimilates an object block into that of a peripheral area and outputs the final image area discrimination result.

10. An image area discrimination apparatus according to claim 9, wherein said isolated area eradicator processes the object block and at least one block adjacent to the object block so as to have the same image areas as those of the peripheral blocks, when the object block and the at least one block adjacent to the object block are isolated from the peripheral blocks.

11. An image area discrimination apparatus according to claim 7, wherein the image signal input to said block-by-block image area discriminator is a luminance signal.

* * * * *